(12) United States Patent
McDonald (10) Patent No.: US 6,366,284 B1
(45) Date of Patent: *Apr. 2, 2002

(54) GENERATING THREE-DIMENSIONAL BAR CHARTS WITH UNOBSCURED BLOCKS

(75) Inventor: Stuart I. McDonald, Sunnyvale, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,274

(22) Filed: Oct. 1, 1998

(51) Int. Cl.[7] .......................... G06T 11/20; G06T 15/40; G06F 15/00
(52) U.S. Cl. ..................... 345/440; 345/440.2; 345/421; 707/503
(58) Field of Search ............................... 345/440, 420, 345/441, 440.2, 421; 707/503

(56) References Cited

U.S. PATENT DOCUMENTS

| | | | | |
|---|---|---|---|---|
| 5,461,708 A | * | 10/1995 | Kahn | 345/440 |
| 5,555,354 A | * | 9/1996 | Strasnick et al. | 345/440 |
| 5,719,558 A | * | 2/1998 | Namba et al. | 345/35 |

OTHER PUBLICATIONS

"Implementing Two–Dimensional Graphics in Three–Dimensional Code" IBM Technical Disclosure Bulletin, US, IBM Corp. New York. vol. 33, No. 1A, Jun. 1990 (1990–06), p. 443–444 XPOOO117789 ISSN: 0018–8689 p. 444, paragraph 2; figure 2.

* cited by examiner

Primary Examiner—Jeffery Brier
Assistant Examiner—Anthony Blackman
(74) Attorney, Agent, or Firm—Park, Vaughan & Fleming LLP (57) ABSTRACT

The present invention provides a method and apparatus for generating three-dimensional bar charts by interspersing non-rectangular shapes amongst rectangular boxes so that the rectangular boxes and non-rectangular shapes tend not to obscure each other. To this end, one embodiment of the present invention provides a method that operates by receiving a set of data values to be displayed in the three-dimensional bar chart. The set of data values is divided into two subsets. A first subset is represented by rectangular boxes projecting from a two-dimensional grid, so that a height of a given box above the two-dimensional grid bears a functional relationship to a data value being displayed by the given box. A second subset is represented by non-rectangular shapes projecting from the two-dimensional grid, which are interspersed between the rectangular boxes, so that a height of a given non-rectangular shape bears a functional relationship to a data value being displayed by the given non-rectangular shape. The method also includes rendering a perspective view of the rectangular boxes and the non-rectangular shapes, and outputting the perspective view to a display device. One variation of the above embodiment alternates tetrahedra with rectangular boxes, wherein the tetrahedra are oriented so that a given tetrahedron is balanced on a lower edge, parallel to a left-right axis of the two-dimensional grid, with an upper orthogonal edge parallel to a fore-aft axis.

22 Claims, 5 Drawing Sheets

BEFORE

FIG. 3

AFTER

GENERATING THREE-DIMENSIONAL BAR CHARTS WITH UNOBSCURED BLOCKS

Copyright Notice Pursuant to 37 C.F.R. § 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to computer graphics. More particularly, the present invention relates to a method and an apparatus that generates three-dimensional bar charts that use various shapes (including non-rectangular solids) to represent data points so that the various shapes tend not to obscure each other.

Three-dimensional bar charts typically represent a two-dimensional data set as a uniform grid of rectangular blocks of varying heights. This representation can enable a person viewing a three-dimensional bar chart to detect certain patterns in the data. However, when two-dimensional data is plotted on a three-dimensional bar chart, occasionally one rectangular block obscures another. This is especially true when a three-dimensional bar chart is viewed from a preferred angle: centered, head-on, and from slightly above. Viewed from this angle, the taller blocks tend to obscure shorter blocks that appear behind the taller blocks.

One solution to this problem is to make the blocks translucent, so that a given block is visible through another block even if it is obscured by the other block. However, the process of ray tracing translucent solids to render realistic translucent images is too slow and expensive using today's computer hardware. Furthermore, displaying translucent solids would require displays that provide millions of colors to view the resulting images, and these types of displays are not commonly available on all computing systems.

SUMMARY

The present invention provides a method and apparatus for generating three-dimensional bar charts by interspersing non-rectangular shapes amongst rectangular boxes so that the rectangular boxes and non-rectangular shapes tend not to obscure each other. To this end, one embodiment of the present invention provides a method that operates by receiving a set of data values to be displayed in the three-dimensional bar chart. The set of data values is divided into two subsets. A first subset is represented by rectangular boxes projecting from a two-dimensional grid, so that a height of a given box above the two-dimensional grid bears a functional relationship to a data value being displayed by the given box. A second subset is represented by non-rectangular shapes projecting from the two-dimensional grid, which are interspersed between the rectangular boxes, so that a height of a given non-rectangular shape bears a functional relationship to a data value being displayed by the given non-rectangular shape. The method also includes rendering a perspective view of the rectangular boxes and the non-rectangular shapes, and outputting the perspective view to a display device. One variation of the above embodiment alternates tetrahedra with rectangular boxes, wherein the tetrahedra are oriented so that a given tetrahedron is balanced on a lower edge, parallel to a left-right axis of the two-dimensional grid, with an upper, orthogonal edge parallel to a fore-aft axis.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may originate from a communications network, such as the Internet.

Computer System

Figure 1:
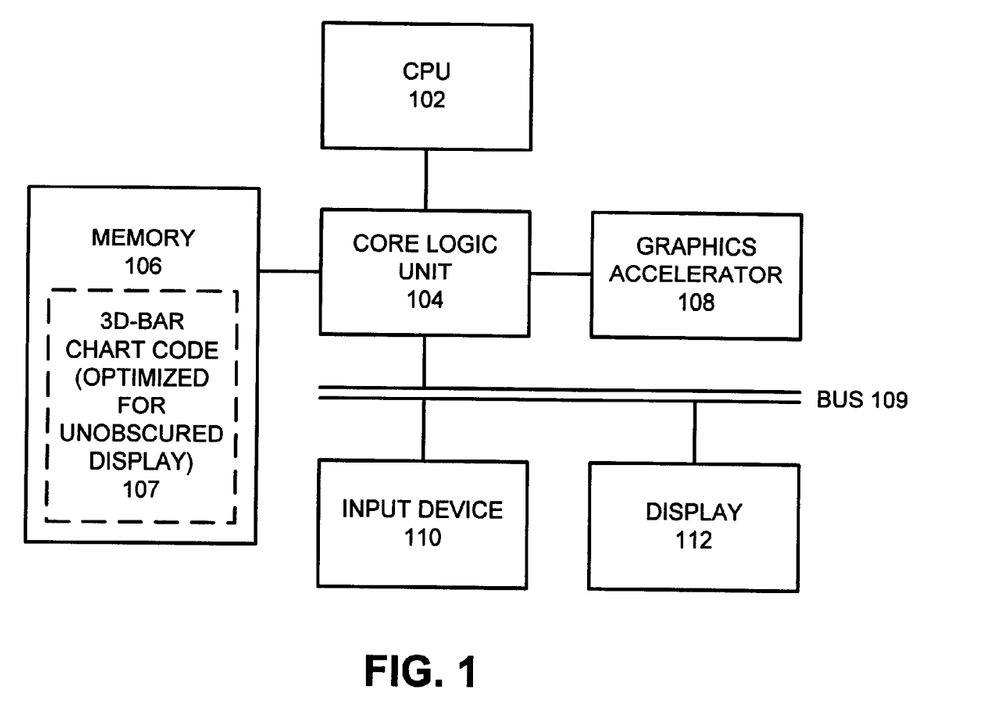
FIG. 1 illustrates a computer system for generating and displaying a three-dimensional bar chart in accordance with an embodiment of the present invention.

FIG. 1 illustrates a computer system for generating and displaying a three-dimensional bar chart in accordance with an embodiment of the present invention. The computer system illustrated in FIG. 1 includes central processing unit (CPU) 102, which is coupled to memory 106, graphics accelerator 108 and bus 109 through core logic unit 104. Bus 109 is further coupled to input device 110 and display 112. CPU 102 may be any type of processing circuitry that performs computational operations in a computer system; this includes, but is not limited to, a microprocessor, a device controller or a mainframe processor. Core logic unit 104 may be any type of switching circuitry that can be used to couple together CPU 102, memory 106, graphics accelerator 108 and bus 109. Memory 106 may be any type of volatile or non-volatile memory for a computer system in which processor 102 can store code and/or data. Graphics accelerator 108 may be any type of special-purpose circuitry for performing computer graphics computations. This includes, but is not limited to, circuitry for performing two-dimensional and three-dimensional computer graphics computations. Input device 110 may be any type of device that a human operator can use to input information and commands into the computer system. This may include input devices such as a keyboard or a mouse. Display 112 may be any type of device that can be used for displaying three-dimensional bar charts.

During operation, the computer system illustrated in FIG. 1 typically operates as follows. A system operator inputs a command to produce a three-dimensional bar chart into input device 110. In response to this command, CPU 102 performs a set of image generation operations by executing three-dimensional bar chart code 107 within memory 106, and by performing certain operations using graphics accelerator 108, to produce and render the desired three-dimensional bar chart. Finally, the three-dimensional bar chart is presented on display 112 for viewing by the system operator.

Note that although the illustrated computer system has a particular architecture, including core logic unit 104 and graphics accelerator 108, the invention is not tied to this architecture. In general, any computer system that can execute computer graphics code may be used. If a computer system does not have a graphics accelerator 108, the graphics operations may be implemented in software.

Generating Three-Dimensional Bar Chart

Figure 2:
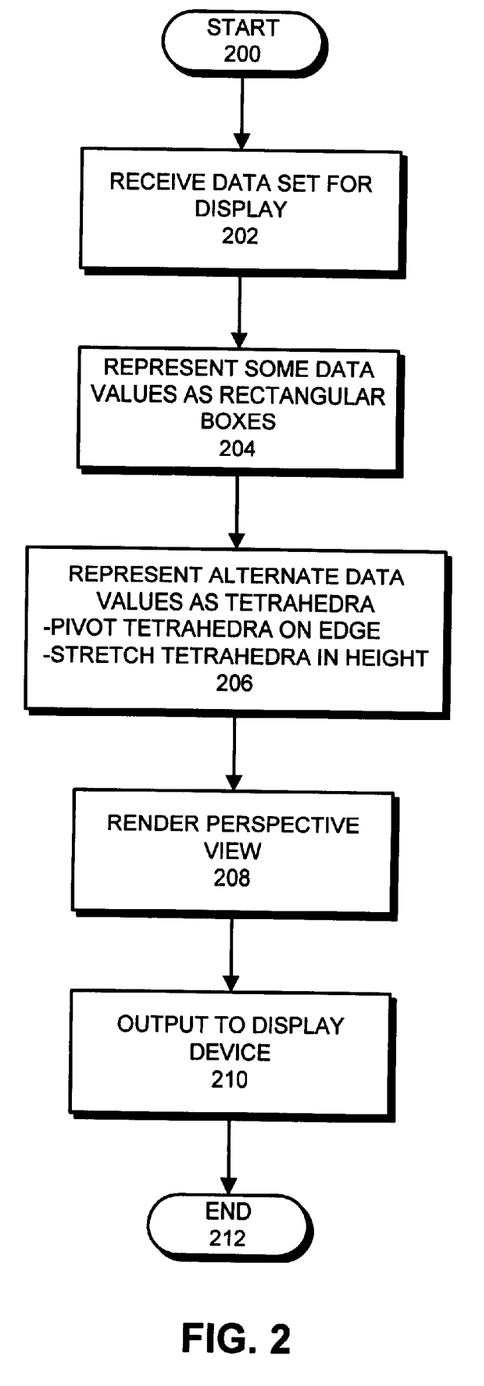
FIG. 2 is a flow chart illustrating the operations of generating and displaying a three-dimensional bar chart in accordance with an embodiment of the present invention.

FIG. 2 is a flow chart illustrating the operations of generating and displaying a three-dimensional bar chart in accordance with an embodiment of the present invention. The system first receives a set of data to be displayed in the three-dimensional bar chart (step 202); this data is in the form of a two-dimensional array of data values. Next, the system represents some of the data values as rectangular boxes extending from the surface of a two-dimensional grid (step 204). The height of a given rectangular box above the surface of the two-dimensional grid bears a functional relationship to a corresponding value in the two-dimensional array of data values. This functional relationship may include a number of possible functional relationships, including linear and logarithmic relationships.

The system represents other data values as tetrahedra that have been balanced on edge and stretched in a height (step 206). In general, any non-rectangular shape may be used for the alternate data values. However, using tetrahedra provides certain advantages, which are discussed in more detail below. Next, the system renders a perspective view of the two-dimensional grid, including the rectangular bars and tetrahedra (step 208). This perspective view is then displayed to an output device, such as display 112 from FIG. 1 (step 210).

Tetrahedra

One embodiment of the present invention intersperses certain types of tetrahedra between rectangular blocks. These tetrahedra are balanced on edge, parallel to the left-right axis of the displayed bar chart, with an upper, orthogonal edge parallel to the fore-aft axis. Additionally, each tetrahedron has the same length, width and height as the rectangular solid that would be there in a conventional bar chart. All "stretching" of tetrahedra is in height, along the Z-axis, perpendicular to the X-Y plane in which the grid of blocks resides.

A tetrahedron is the simplest of solids: it consists of four points in space, forming four triangular faces and six edges. Commonly, in computer graphics packages the natural resting position of a pre-defined tetrahedron is on one of its faces. However, one embodiment of the present invention uses a particular tetrahedron, which is balanced on edge with its upper, orthogonal edge receding in the distance. Hence, a pre-defined tetrahedron from a computer graphics package must be translated and rotated in order to have this orientation.

To better visualize this shape, imagine holding two toothpicks, one in each hand, with each toothpick between your thumb and index finger along its length. With your left-hand palm up, hold the left toothpick parallel to the edge of a desk in front of you. With your right-hand palm down, hold the right toothpick above the left one, but suspended in midair slightly above it, and orthogonal to it, squarely centered above mutual midpoints. From above, you would see a '+'.

As the two toothpicks are separated in height, they stretch the tetrahedral-shaped block: the left hand's toothpick forms the teetering bottom edge of the tetrahedron; the right hand's toothpick forms the upper orthogonal edge; and the four tips of the two toothpicks form the vertices of the stretched tetrahedron.

Using a balanced-on-an-edge and stretched tetrahedron in a three-dimensional bar chart provides certain advantages. When viewed from the front, a triangular face pointed upward is visible. When viewed from the side, another triangular face is visible, but this face points downward. The tetrahedron appears "self-similar" from any angle, like a stretched cube does, and hence is easy to visualize by the user when alternated with rectangular boxes in every other row.

The above-described tetrahedral shape has advantages when compared with other possible shapes, such as inverted cones, pyramids, and tetrahedra in other orientations. An inverted cone is very expensive and slow to render in three dimensions. Furthermore, cones are also too point. Balanced-on-an-edge and stretched tetrahedra have the desirable property that their pointy top part is a wedge, not a single point. Hence, when they are rendered in three dimensions they provide additional perspective clues as to height when projected by the mind's eye onto ticked grids along the back walls or side walls surrounding a three-dimensional bar chart. A stretched pyramid, resting on its four-sided base, again has too pointy of an apex. Ditto for a tetrahedron resting on its face.

Another shape that comes to mind is a tent shape, say like a wedge of cheese, apex edge pointed vertically and receding in the distance. This shape has the drawback that it does not look like the same shape when viewed from the side as it does when viewed from the front. It also misdirects a viewer's attention into thinking that there is hidden significance to the odd shape.

Additionally, many three-dimensional graphics hardware accelerators handle three-dimensional shaded triangles faster than three-dimensional shaded rectangles. Hence, the present invention's use of balanced-on-an-edge and stretched tetrahedra can potentially allow rendering of three-dimensional bar charts to proceed faster than the conventional method of using stretched cubes alone.

Figure 5:
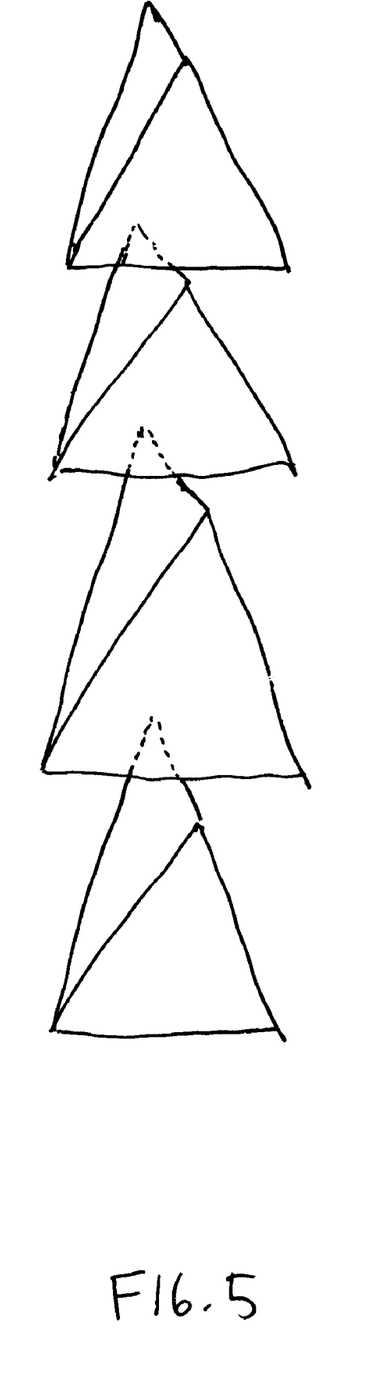
FIG. 5 illustrates alternative embodiment of a shape to be used in a bar chart that uses a stack of balanced-on-edge-and-stretched tetrahedra to represent data points in a accordance with an embodiment of the present invention.

FIG. 5 illustrates alternative embodiment of a shape to be used in a bar chart that uses a stack of balanced-on-edge-and-stretched tetrahedra to represent data points. This shape tends to be more visible than a single tetrahedron. However, it also tends to obscure objects behind it more than a single tetrahedron.

EXAMPLE

Figure 3:
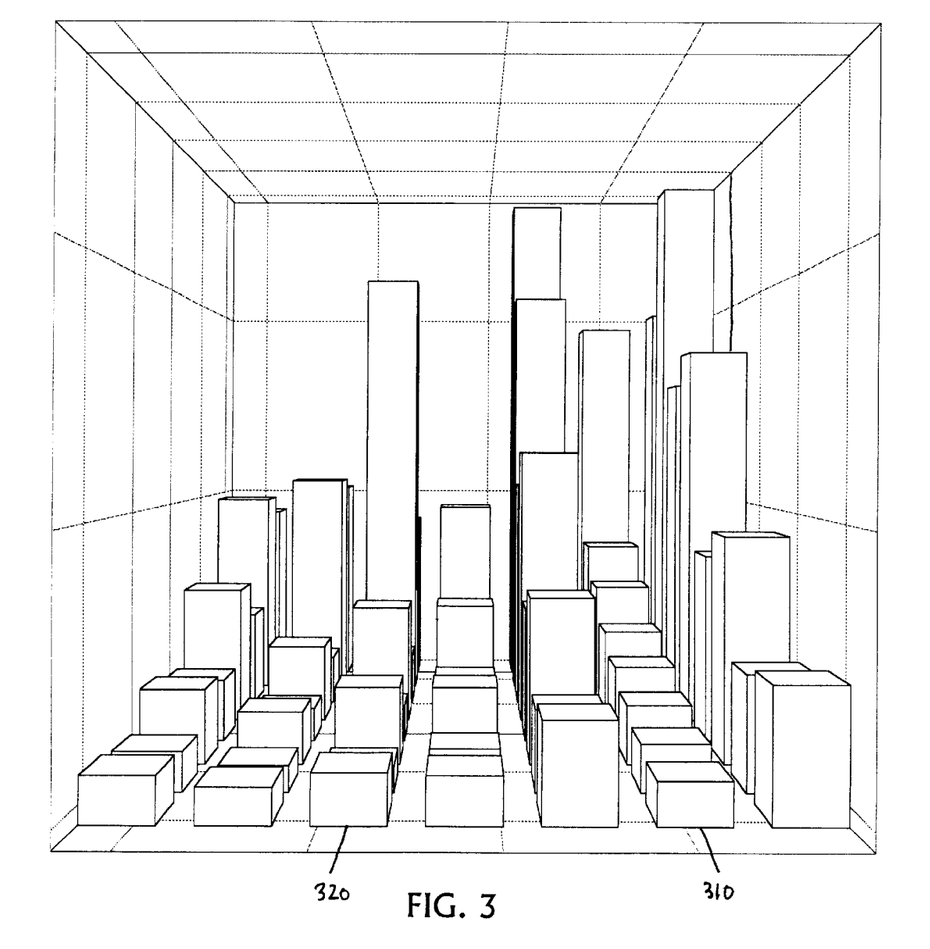
FIG. 3 illustrates a conventional three-dimensional bar chart comprised of rectangular boxes on a two-dimensional grid.

FIG. 3 illustrates a conventional three-dimensional bar chart comprised of rectangular boxes extending from a two-dimensional grid. This bar chart includes a separate rectangular box for each data point. The value of each data point can be estimated by viewing its corresponding rectangular box against the grid lines that appear on the walls and on the top of a box that bounds the three-dimensional bar chart. The rectangular boxes can be easily viewed if the data is monotonically increasing from front-to-back as in the second front-to-back row 310 from the right-hand side of FIG. 3. However, note that if data values alternate in height, such as in the third front-to-back row from the left-hand side 320 of FIG. 3, taller blocks tend to obscure shorter blocks that appear behind them.

Figure 4:
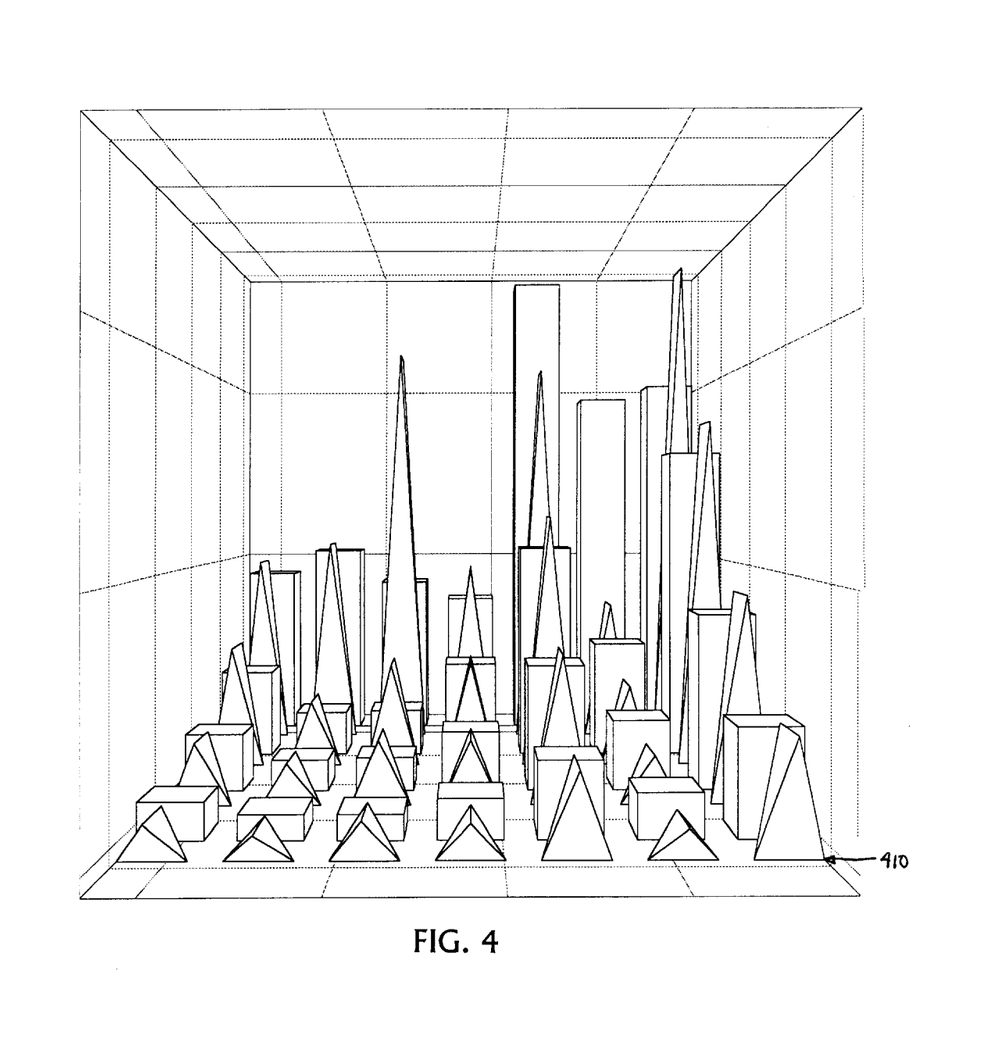
FIG. 4 illustrates a three-dimensional bar chart comprised of alternating rectangular boxes and balanced-on-edge tetrahedra on a two-dimensional grid in accordance with an embodiment of the present invention.

FIG. 4 illustrates a three-dimensional bar chart comprised of alternating rectangular boxes and balanced-on-edge tetrahedra on a two-dimensional grid in accordance with an embodiment of the present invention. This figure represents the same data set that appears in FIG. 3, except that the data points in alternate left-to-right rows are represented by balanced-on-edge-and-stretched tetrahedra. Note how the tetrahedra tend to obscure less of the shorter rectangular bars behind them than the rectangular bars they replace when compared with three-dimensional bar chart of FIG. 3. Also note that the front left-to-right row 410 of the bar chart in FIG. 4 is composed of tetrahedra. This allows the rest of the bar chart to be viewed even if data values in the front row 410 are larger than data values in following rows.

Although the bar chart illustrated in FIG. 4 uses alternating rows of tetrahedra. In general, the tetrahedra can be inserted into the bar chart in any pattern that facilitates viewing of the data set. In one embodiment of the present invention, the tetrahedra are inserted every "N" rows, where N can be any integer value. In another embodiment, the data set is first examined to determine the heights of various bars, and then a set of bars that would tend to obscure other bars can be selected, and these bars are converted to tetrahedra.

The computer code used to generate the bar charts illustrated in FIGS. 3 and 4 appears in Table 1. This code is written in the Macsyma™ language, which is part

TABLE 1

```
/* Copyright © 1998 SUN Microsystems, Inc. All Rights Reserved */
t:matrix ([
90,   104,  85,   75,   262,  193,  201],[
99    109,  215,  95,   206,  74,   264],[
43,   22,   23,   47,   108,  57,   168],[
60,   34,   52,   53,   125,  41,   172],[
26,   14,   15,   27,   57,   32,   80],[
30,   21,   31,   31,   67,   24,   92],[
15,   10,   10,   16,   31,   18,   44],[
17,   13,   18,   17,   36,   15,   48])$
/* Procedure BEFORE picture: */
BLOCK([PLOT_SIZE : 72,PLOT_PHI : 0,PLOT_THETA : 0],
    APPLY('COMBINE_PLOTS,
    APPLY('APPEND,
    MAKELIST(MAKELIST(FUNMAKE('PLOT_3D_FIGURE,
        ['CUBE,[1+3*(i-1),1+3*(j-1), t[i,j]/2],
        [2,2,t[i,j]],0.0,signum(4-j)*0.05]),
        J,1,7),I,1,8))))$
/* Produces AFTER picture: */
PLOT_MYTETRA(x,y,height) :=(
block([nodes,polygons],
    /* Plot a balanced-on-edge-&-stretched-tetrahedron. */
    ?mlocal(nodes,polygons),
    modedeclare(completearray(nodes),float,
completearray(polygons),any),
    array(nodes,float,3,2),array(polygons,complete,3),
    fillarray(polygons,[[1,2,3],[0,3,2],[0,1,3],[0,2,1]]),
    fillarray(nodes,sfloat([x,y+1,0, x,y−1,0, x−1,y,height,
        x+1,y,height]) ),
    apply('plotsurf,[[nodes,polygons]]),
    ?munlocal( ), 'done ))$
compile(plot_mytetra);
BLOCK([PLOT_SIZE : 72,PLOT_PHI : 0,PLOT_THETA : 0],
```

TABLE 1-continued

```
    APPLY('COMBINE_PLOTS,
    APPLY('APPEND,    [
    APPLY('APPEND,
    MAKELIST(MAKELIST(FUNMAKE('PLOT_MYTETRA,
        [1+3*(i−1), 1+3*(j−1), t[i,j]]),
    J,1,7),I,2..2..8)),
    APPLY('APPEND,
    MAKELIST(MAKELIST(FUNMAKE('PLOT_3D_FIGURE,
        ['CUBE,[1+3*(i−1),1+3*(j−1),t[i,j]/2],
        [2,2,t[i,j]],0.0,signumr−j)*0.05]),
    J,1,7),I,1..2..8))]
    )))$
``` of the Macsyma™ program that performs symbolic mathematical operations, which is produced and distributed by Macsyma, Inc. of Arlington, Mass. The first part of this code listing includes the data to be displayed. Next, the listing includes code that generates FIG. 3. This code uses a function to produce the three-dimensional bar chart. Hence, it is very simple. Finally, the listing includes code that generates the tetrahedra. This code is complicated by the fact that the Macsyma™ language does not include functions to produce a balanced-on-edge-and-stretched tetrahedron. The Macsyma™ language merely includes functions to produce a tetrahedron that is resting on one of its faces. Hence, special code has been included to generate a balanced-on-edge-and-stretched tetrahedron.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention. The scope of the invention is defined by the appended claims.

What is claimed is:

1. A method for generating a bar chart to display three-dimensional data values, comprising:

receiving a set of three-dimensional data values to be displayed in the bar chart;

representing a first subset of three-dimensional data values from the set as a plurality of rectangular boxes projecting from a two-dimensional grid, each rectangular box having a height above the two-dimensional grid, so that a height of a given rectangular box bears a functional relationship to a three-dimensional data value being displayed by the given rectangular box;

wherein a first dimension and a second dimension of the three-dimensional data value specify a two-dimensional location within the two-dimensional grid, and a third dimension specifies the height of the given rectangular box above the two-dimensional grid;

representing a second subset of three-dimensional data values from the set as non-rectangular shapes projecting from the two-dimensional grid and interspersed between the plurality of rectangular boxes, each non-rectangular shape having a height above the two-dimensional grid, so that a height of a given non-rectangular shape bears a functional relationship to a three-dimensional data value being displayed by the given non-rectangular shape;

wherein interspersing the non-rectangular shapes between the plurality of rectangular boxes involves alternating the non-rectangular shapes with the plurality of rectangular boxes, so that larger data values represented by the non-rectangular shapes do not obscure smaller data values represented by the rectangular shapes;

computing a three-dimensional view of the two-dimensional grid, including the plurality of rectangular boxes and the non-rectangular shapes; and outputting the three-dimensional view to a display device.

2. The method of claim 1, wherein representing the second subset of three-dimensional data values includes representing the second subset of data values as tetrahedra.

3. The method of claim 2, wherein the tetrahedra are oriented so that a given tetrahedron is balanced on a lower edge, parallel to a left-right axis of the two-dimensional grid, with an upper orthogonal edge parallel to a fore-aft axis.

4. The method of claim 1, wherein representing the second subset of three-dimensional data values from the set as non-rectangular shapes includes representing a given three-dimensional data value as a stack of tetrahedra balanced on edge and stacked to a height above the two-dimensional grid that bears a functional relationship to the data value being displayed.

5. The method of claim 1, further comprising providing grid lines on at least one wall extending perpendicularly from the two-dimensional grid so that heights of the plurality of rectangular boxes and the non-rectangular shapes can be estimated with respect to the grid lines.

6. The method of claim 5, wherein the non-rectangular shapes recede in the perspective view so that the heights of the non-rectangular shapes can be estimated by an observer with respect to the grid lines.

7. The method of claim 1, wherein interspersing the non-rectangular shapes includes inserting a non-rectangular shape at regular intervals between the plurality of rectangular boxes.

8. The method of claim 1, wherein a front row of the two-dimensional grid includes non-rectangular shapes.

9. The method of claim 1, wherein interspersing the non-rectangular shapes between the plurality of rectangular boxes includes:
   selecting the second subset of three-dimensional data values by selecting data values that if viewed as a rectangular boxes would obscure other rectangular boxes in the perspective view; and
   representing the second subset of three-dimensional data values as non-rectangular shapes that would not obscure the other rectangular boxes in the perspective view.

10. The method of claim 1, wherein the functional relationship is linear.

11. The method of claim 1, wherein the three-dimensional view includes a three-dimensional perspective view.

12. The method of claim 1, wherein computing the three-dimensional view includes rendering a bitmap of the three-dimensional view.

13. A method for generating a bar chart to display three-dimensional data values, comprising:
   receiving a set of three-dimensional data values to be displayed in the bar chart;
   representing a first subset of three-dimensional data values from the set as a plurality of rectangular boxes projecting from a two-dimensional grid, each rectangular box having a height above the two-dimensional grid, so that a height of a given rectangular box bears a functional relationship to a three-dimensional data value being displayed by the given rectangular box;
   wherein a first dimension and a second dimension of the three-dimensional data value specify a two-dimensional location within the two-dimensional grid, and a third dimension specifies the height of the given rectangular box above the two-dimensional grid;
   representing a second subset of three-dimensional data values from the set as non-rectangular shapes projecting from the two-dimensional grid and interspersed between the plurality of rectangular boxes, each non-rectangular shape having a height above the two-dimensional grid, so that a height of a given non-rectangular shape bears a functional relationship to a three-dimensional data value being displayed by the given non-rectangular shape;
   wherein interspersing the non-rectangular shapes between the plurality of rectangular boxes involves alternating the non-rectangular shapes with the plurality of rectangular boxes, so that larger data values represented by the non-rectangular shapes do not obscure smaller data values represented by the rectangular shapes;
   providing grid lines on at least one wall extending perpendicularly from the two-dimensional grid so that the heights of the plurality of rectangular boxes and the tetrahedra can be estimated with respect to the grid lines;
   rendering a perspective view of the two-dimensional grid, including the plurality of rectangular boxes and the tetrahedra; and
   outputting the perspective view to a display device.

14. A computer readable storage medium storing instructions that when executed by a computer cause the computer to perform a method for generating a bar chart to display three-dimensional data values, comprising:
   receiving a set of three-dimensional data values to be displayed in the bar chart;
   representing a first subset of three-dimensional data values from the set as a plurality of rectangular boxes projecting from a two-dimensional grid, each rectangular box having a height above the two-dimensional grid, so that a height of a given rectangular box bears a functional relationship to a three-dimensional data value being displayed by the given rectangular box;
   wherein a first dimension and a second dimension of the three-dimensional data value specify a two-dimensional location within the two-dimensional grid, and a third dimension specifies the height of the given rectangular box above the two-dimensional grid;
   representing a second subset of three-dimensional data values from the set as non-rectangular shapes projecting from the two-dimensional grid and interspersed between the plurality of rectangular boxes, each non-rectangular shape having a height above the two-dimensional grid, so that a height of a given non-rectangular shape bears a functional relationship to a three-dimensional data value being displayed by the given non-rectangular shape;
   wherein interspersing the non-rectangular shapes between the plurality of rectangular boxes involves alternating the non-rectangular shapes with the plurality of rectangular boxes, so that larger data values represented by the non-rectangular shapes do not obscure smaller data values represented by the rectangular shapes;
   computing a three-dimensional view of the two-dimensional grid, including the plurality of rectangular boxes and the non-rectangular shapes; and
   outputting the three-dimensional view to a display device.

15. An apparatus that generates a bar chart to display three-dimensional data values, comprising:
   an input that receives a set of three-dimensional data values to be displayed in the bar chart;

a rectangular box generator that represents a first subset of three-dimensional data values from the set as a plurality of rectangular boxes projecting from a two-dimensional grid, each rectangular box having a height above the two-dimensional grid, so that a height of a given rectangular box bears a functional relationship to a three-dimensional data value being displayed by the given rectangular box;

wherein a first dimension and a second dimension of the three-dimensional data value specify a two-dimensional location within the two-dimensional grid, and a third dimension specifies the height of the given rectangular box above the two-dimensional grid;

a non-rectangular shape generator that represents a second subset of three-dimensional data values from the set as non-rectangular shapes projecting from the two-dimensional grid and interspersed between the plurality of rectangular boxes, each non-rectangular shape having a height above the two-dimensional grid, so that a height of a given non-rectangular shape bears a functional relationship to a three-dimensional data value being displayed by the given non-rectangular shape;

wherein the non-rectangular shape generator is configured to intersperse the non-rectangular shapes between the plurality of rectangular boxes by alternating the non-rectangular shapes with the plurality of rectangular boxes, so that larger data values represented by the non-rectangular shapes do not obscure smaller data values represented by the rectangular shapes;

a computing engine that computes a three-dimensional view of the two-dimensional grid, including the plurality of rectangular boxes and the non-rectangular shapes; and a display device that displays the perspective view.

16. The apparatus of claim 15, wherein the computing engine is configured to render a bitmap of the three-dimensional view.

17. A method for displaying a bar chart of three-dimensional data values, comprising:

receiving a command to display the bar chart;

receiving a set of three-dimensional data values to be displayed in the bar chart;

representing a first subset of three-dimensional data values from the set as a plurality of rectangular boxes projecting from a two-dimensional grid, each rectangular box having a height above the two-dimensional grid, so that a height of a given rectangular box bears a functional relationship to a three-dimensional data value being displayed by the given rectangular box;

wherein a first dimension and a second dimension of the three-dimensional data value specify a two-dimensional location within the two-dimensional grid, and a third dimension specifies the height of the given rectangular box above the two-dimensional grid; and representing a second subset of three-dimensional data values from the set as non-rectangular shapes projecting from the two-dimensional grid and interspersed between the plurality of rectangular boxes, each non-rectangular shape having a height above the two-dimensional grid, so that a height of a given non-rectangular shape bears a functional relationship to a three-dimensional data value being displayed by the given non-rectangular shape;

wherein interspersing the non-rectangular shapes between the plurality of rectangular boxes involves alternating the non-rectangular shapes with the plurality of rectangular boxes, so that larger data values represented by the non-rectangular shapes do not obscure smaller data values represented by the rectangular shapes.

18. The method of claim 17, wherein representing the second subset of data values includes representing the second subset of data values as tetrahedra.

19. The method of claim 18, wherein the tetrahedra are oriented so that a given tetrahedron is balanced on a lower edge, parallel to a left-right axis of the three dimensional bar chart, with an upper orthogonal edge parallel to a fore-aft axis.

20. A method for displaying a bar chart of three-dimensional data values, comprising:

receiving a command to display the bar chart;

receiving a set of three-dimensional data values to be displayed in the bar chart;

representing a first subset of three-dimensional data values from the set as a first shape projecting from a two-dimensional grid, each first shape having a height above the two-dimensional grid, so that a height of a given first shape bears a functional relationship to a three-dimensional data value being displayed by the given first shape;

wherein a first dimension and a second dimension of the three-dimensional data value specify a two-dimensional location within the two-dimensional grid, and a third dimension specifies the height of the given rectangular box above the two-dimensional grid; and representing a second subset of three-dimensional data values from the set as a second shape projecting from the two-dimensional grid and interspersed between the first shapes, each second shape having a height above the two-dimensional grid, so that a height of a given second shape bears a functional relationship to a three-dimensional data value being displayed by the given second shape;

wherein interspersing the second shapes between the first shapes involves alternating the second shapes with the first shapes, so that larger data values represented by the non-rectangular shapes do not obscure smaller data values represented by the rectangular shapes.

21. A method for generating a bar chart of three-dimensional data values, comprising:

receiving a set of three-dimensional data values to be displayed in the bar chart;

representing the set of three-dimensional data values as a plurality of shapes projecting from a two-dimensional grid, each shape in the plurality having a height above the two-dimensional grid, so that a height of a given shape bears a functional relationship to a three-dimensional data value being displayed by the given shape, so that shapes representing larger data values represented by non-rectangular shapes do not obscure shapes representing smaller data values;

wherein a first dimension and a second dimension of the three-dimensional data value specify a two-dimensional location within the two-dimensional grid, and a third dimension specifies the height of the given shape above the two-dimensional grid;

wherein the plurality of shapes includes at least one tetrahedron balanced on a lower edge, parallel to a left-right axis of the two-dimensional grid, with an upper orthogonal edge parallel to a fore-aft axis computing a three-dimensional view of the two-dimensional grid, including the plurality of shapes; and outputting the three-dimensional view to a display device.

22. A method for generating a bar chart of three-dimensional data values, comprising:

receiving a set of three-dimensional data values to be displayed in the bar chart;

representing a first subset of three-dimensional data values from the set as a plurality of tetrahedra projecting from a two-dimensional grid, each tetrahedron having a height above the two-dimensional grid, so that a height of a given tetrahedron bears a functional relationship to a three-dimensional data value being displayed by the given tetrahedron;

representing a second subset of three-dimensional data values from the set as a plurality of non-tetrahedral shapes projecting from the two-dimensional grid and interspersed between the plurality of tetrahedra, each non-tetrahedral shape having a height above the two-dimensional grid, so that a height of a given non-tetrahedral shape bears a functional relationship to a three-dimensional data value being displayed by the given non-tetrahedral shape;

wherein interspersing the non-tetrahedral shapes between the plurality of tetrahedra involves alternating the non-tetrahedral shapes with the plurality of tetrahedra, so that smaller data values represented by the non-tetrahedral shapes are not obscured by larger data values represented by the tetrahedral shapes;

wherein a first dimension and a second dimension of the three-dimensional data value specify a two-dimensional location within the two-dimensional grid, and a third dimension specifies the height of the given non-tetrahedral shape above the two-dimensional grid;

computing a three-dimensional view of the two-dimensional grid, including the plurality of tetrahedra and the plurality of non-tetrahedral shapes; and outputting the three-dimensional view to a display device.

* * * * *